Figure 1:
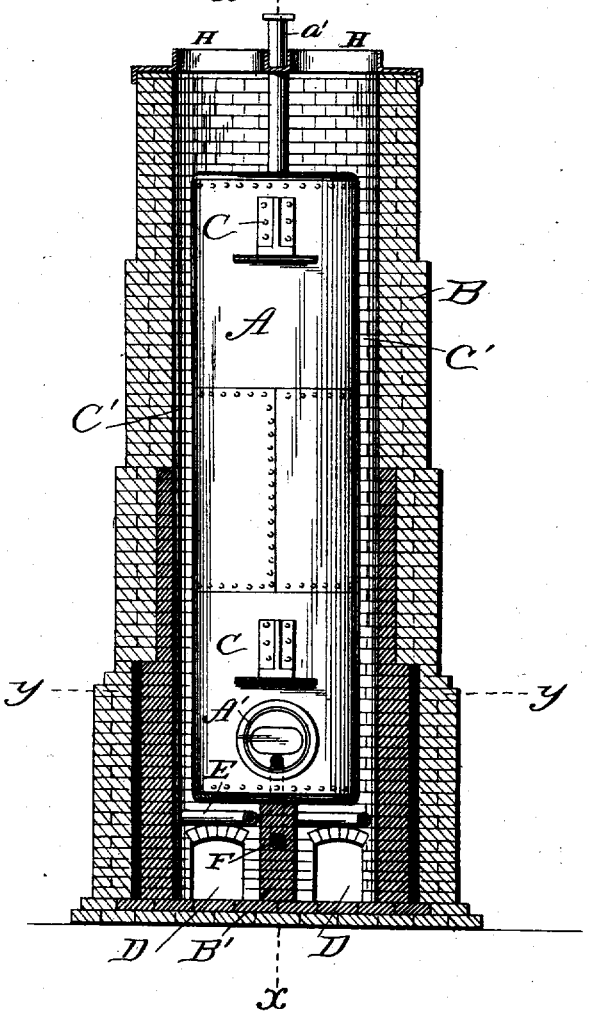

2 Sheets—Sheet 1.

S. RUNSER.

SETTING FOR STEAM BOILERS.

No. 11,268. Reissued Sept. 6, 1892.

Attest
Walter Waldron
F. L. Middleton

Inventor
Sebastian Runser
by Ellis Spear
Atty.

THE NORRIS PETERS CO., PHOTO-LITHO., WASHINGTON, D. C.

S. RUNSER.
SETTING FOR STEAM BOILERS.
No. 11,268. Reissued Sept. 6, 1892.
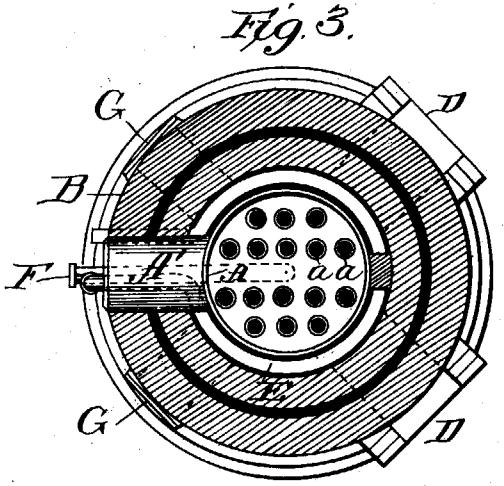
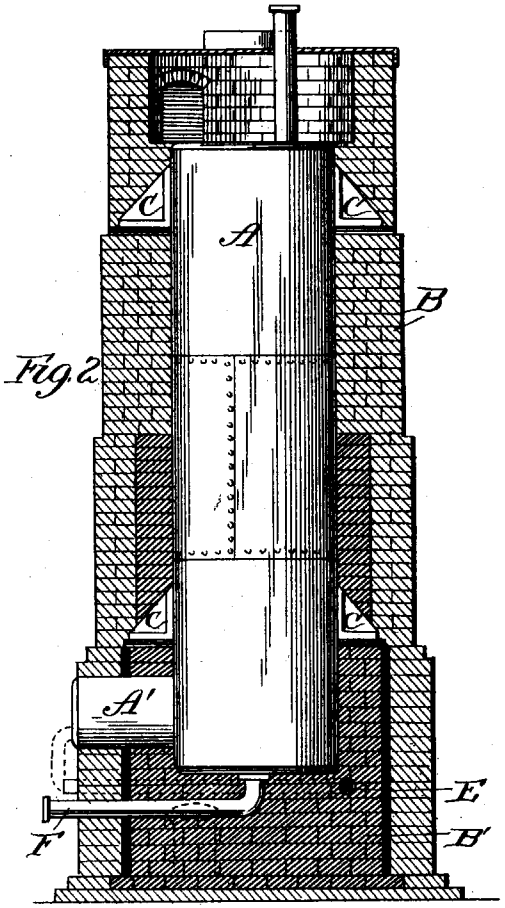
Attest
William Macadam
F. L. Middleton
Inventor
Sebastian Runser
by Elliot Spear
Atty
THE NORRIS PETERS CO., PHOTO-LITHO., WASHINGTON, D. C.

UNITED STATES PATENT OFFICE.

SEBASTIAN RUNSER, OF GREENVILLE, PENNSYLVANIA.

SETTING FOR STEAM-BOILERS.

SPECIFICATION forming part of Reissued Letters Patent No. 11,268, dated September 6, 1892.

Original No. 454,771, dated June 23, 1891. Application for reissue filed April 4, 1892. Serial No. 427,764.

*To all whom it may concern:*

Be it known that I, SEBASTIAN RUNSER, a citizen of the United States of America, residing at Greenville, in the county of Mercer and State of Pennsylvania, have invented certain new and useful Improvements in Settings for Steam-Boilers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in settings for steam-boilers.

The object of the invention is to provide an improved boiler-setting which is adapted to be used in connection with puddling-furnaces, so that the waste heat and products of combustion therefrom can be utilized for heating to generate steam.

My invention consists in a boiler-setting provided with a vertical partition-wall which, in connection with the boiler, substantially separates the boiler-setting into two parts, so that the heat from either of the puddling-furnaces can be used.

In the accompanying drawings, forming part of this specification, Figure 1 is a central vertical section of a boiler-setting constructed in accordance with my invention. Fig. 2 is a vertical section on the line *x x* of Fig. 1. Fig. 3 is a vertical section on the line *y y* of Fig. 1.

A refers to the boiler, which is provided with vertical flues *a a*, said flues being set in the boiler to provide a central transverse space, which is without flues. The boiler is provided near its lower end with a drum A′ of sufficient length to extend through the brickwork.

*a′* refers to the steam-supply pipe, which is attached to the upper portion of the boiler.

B refers to a cylindrical structure or casing of brick, which is provided with a dividing-wall B′, extending transversely under the center of the boiler and upwardly on each side of the same. The boiler rests upon this transverse wall, and in addition to this support the said boiler is provided with brackets C C, which are secured thereto and enter the casing B. These brackets are preferably located on a line with the partition-wall B′, so that they will not interfere with the spaces C′ C′ between the casing B and the boiler, it being understood that the boiler contacts with projecting portions of the casing B at opposite points in the same vertical line with the partition-wall B′, forming practically a part of said partition-wall, and thus divides the casing into two parts.

D refers to the heat-openings or fire-chambers, through which the flame or products of combustion from the puddling-furnaces enter the casing and pass up around one-half the boiler and through the vertical flues. Above these arches or fire-chambers D a circular pipe E is located, one end of which is connected to the drum A, while the other is connected with the feed-water supply.

F refers to a pipe leading from the lower end of the boiler out through one side of the casing, so that water can be drawn off the boiler when desired.

The casing is provided with damper-frames G, each flue-section C′ being provided with two, one being located above the boiler and the other two below. These frames are provided with doors, and through them any ashes or refuse can be withdrawn from the casing, the upper ones permitting access to the vertical flues of the boiler. The top of the casing is surmounted by a two-part casting having openings H H, which lead into the smoke-stacks, and these openings may be provided with dampers, so that the furnace not in use may be cut off.

In the manufacture of iron by puddling-furnaces it is desirable to have steam-power, and in practice while one puddling-furnace is in operation the other may be idle. In case both fires are drawn there will be no necessity for generating steam. When one of the puddling-furnaces is running, the heat therefrom will be conducted through one of the arches and will heat the boiler so as to generate steam, and when the fire is drawn in said furnace the other furnace may be connected therewith. This device utilizes heat which has heretofore been wasted.

Having thus described my invention, I claim—

1. In combination with a casing, a boiler located therein, said casing being divided into two parts by a vertical division-wall of which said boiler forms a part and an independent source of heat for each part, substantially as described.

2. In combination with a casing having a vertical partition-wall, a horizontal transverse wall at the base of the chimney, heat-entrances D D on each side of the partition-wall, and a boiler set within the casing, said boiler having vertical sets of flues on each side of the partition-wall, substantially as described.

3. In combination with the casing B, provided with a vertical partition-wall, a boiler set centrally therein, arches or openings D D, connected to independent heat-supplies, a feed-water pipe located above said arches and apertures provided with casings G, substantially as described.

4. In combination with the casing B, having a transverse and vertical partition-wall, heat-entrances D D on each side of the partition-wall, brackets attached to the boiler and let into the vertical partition-wall, the external diameter of the boiler being less than the internal diameter of the casing to provide flues, and apertures in the casing above and below the boiler connecting with said flues, said apertures having doors, together with a top plate having openings connecting with the flues, substantially as described.

SEBASTIAN RUNSER.

Witnesses:
A. W. WILLIAMS,
JOHN J. STITT.